United States Patent Office 3,436,987
Patented Apr. 8, 1969

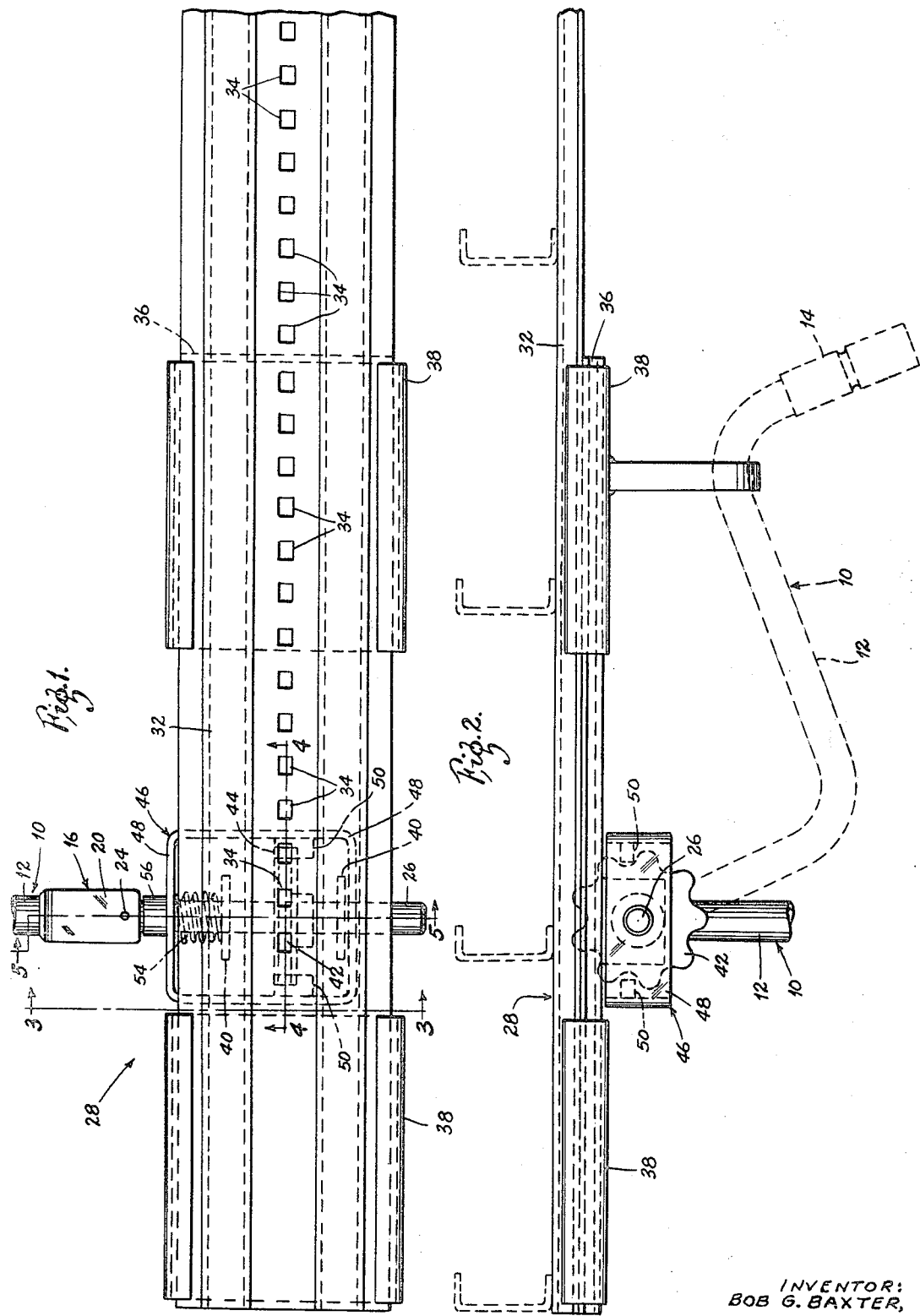

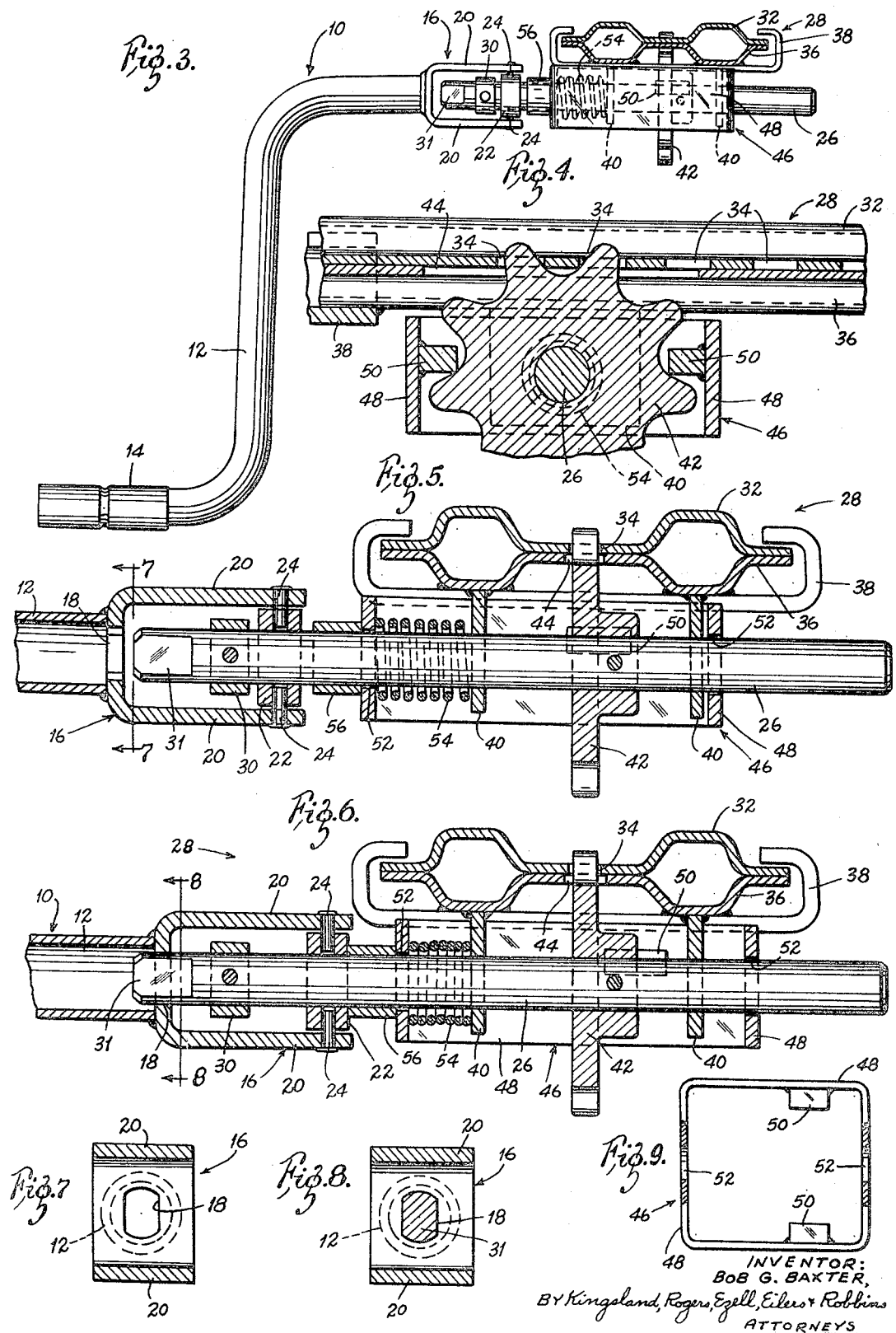

3,436,987
NONREMOVABLE SWIVEL CRANK STRUCTURE
Bob G. Baxter, Winfield, Mo., assignor to The Binkley Company, Warrenton, Mo., a corporation of Missouri
Filed Aug. 21, 1967, Ser. No. 661,920
Int. Cl. F16h 55/12
U.S. Cl. 74—547
5 Claims

ABSTRACT OF THE DISCLOSURE

A swivel crank construction for actuating the landing gear of a truck-trailer, and the like, vertically and/or longitudinally of the body, comprising a crank handle including at one end a socket having opposed fingers, a collar supported by trunnions mounted in the fingers, the collar being disposed on the free end of the operating shaft of an actuating mechanism for moving a truck landing gear mechanism vertically or longitudinally, a collar secured to the shaft against removal between the free end of the shaft and the trunnion supported collar, the free end of the shaft and the socket being of complementary cross sections, the socket being movable to engage the free end of the shaft for interlocking relationship, the trunnions being welded or otherwise secured to the fingers to prevent separation and removal of the socket and crank. For longitudinal movement, a sprocket is mounted on the shaft in operative relationship with movable and stationary members of the landing gear mechanism preventing removal of the trunnion-supported collar and a reciprocating unit for locking and releasing the sprocket effective upon engagement of the end of the shaft with the socket crank and release thereof, respectively.

BACKGROUND OF THE INVENTION

Field of the invention

The present invention relates generally to the truck art, and more particularly to a novel swivel crank construction for trailer-truck, and the like, landing gear mechanisms which is substantially loss-proof, as by theft etc.

Description of the prior art

For many years, cranks have been employed for moving landing gears of trailer-trucks, and the like, vertically and longitudinally of the body thereof. Such cranks have been of the removable type, or the swivel type, in which the crank is moved to one side through swivel means when not in use. Such cranks have been subject to theft, loss by misplacing after use, loss by working loose from the truck in transit, and the like. The loss to truck fleet owners from theft alone runs into many thousands of dollars annually. However, efforts to relieve this situation have been fruitless insofar as the applicant is aware.

SUMMARY OF THE INVENTION

In brief, the present novel swivel crank construction includes a crank handle having a socket at one end including spaced fingers supporting at the free ends a collar through opposed trunnions secured to the fork elements against removal. The collar is disposed on the free end of an operating shaft of an actuating mechanism for vertically or longitudinally moving the landing gear mechanism of a truck-trailer, and the like, the free end of the shaft and the socket being of complementary cross sections so that the shaft may be turned by the crank handle when in operating position. A collar is secured near the shaft end against removal. The finger supported collar and socket are movable along the shaft to engage and disengage the end of the shaft with the socket and to lock and unlock the sprocket of an actuating mechanism for a truck-trailer landing gear mechanism. The swivel crank swivels to an inoperative position along side or beneath the truck body to a provided support when not in use. The swivel arrangement permits placing of the crank in inoperative position after being disconnected from the shaft regardless of the position of the landing gear. There is a free 360° swing of the crank.

Therefore, objects of the present invention are to provide a swivel crank structure which fulfills the long felt need of a crank structure for landing gear mechanisms which is substantially proof against removal; which is readily moved into and out of operating position; which is relatively inexpensive and adapted for effective use over a long period of time; which can be employed effectively with minimum instructions; which can be swiveled to inoperative carry position from any position of adjustment of the landing gear, vertically or longitudinally, and which otherwise fulfills the objects and advantages sought therefor.

The foregoing and other objects and advantages are apparent from the following description taken with the accompanying drawings.

BRIEF DESCRIPTION OF THE DRAWINGS

FIGURE 1 is a top plan view of the shaft engaging socket end of the crank handle forming part of the present invention in engagement with the operating shaft of a longitudinal movement mechanism for the landing gear of a trailer-truck;

FIGURE 2 is a side elevational view thereof, the crank handle being shown in broken lines disposed on a holder in inoperative position;

FIGURE 3 is a transverse vertical cross sectional view taken on substantially the line 3—3 of FIGURE 1;

FIGURE 4 is an enlarged vertical longitudinal cross sectional view taken on substantially the line 4—4 of FIGURE 1;

FIGURE 5 is an enlarged transverse vertical cross sectional view taken on substantially the line 5—5 of FIGURE 1;

FIGURE 6 is a view similar to FIGURE 5, but showing the parts in operative position for moving a landing gear longitudinally;

FIGURE 7 is a transverse cross sectional view taken on substantially the line 7—7 of FIGURE 5;

FIGURE 8 is a transverse cross sectional view taken on substantially the line 8—8 of FIGURE 6; and FIGURE 9 is a plan view of a sprocket locking and releasing unit.

DESCRIPTION OF THE PREFERRED EMBODIMENT

Referring to the drawings more particularly by reference numerals, 10 indicates generally a swivel crank structure made in accordance with the teachings of the present invention, which includes a crank handle 12 on one end of which is a hand grip 14. On the other end of the crank 12 is secured, as by welding, a socket member 16 including a socket portion 18 of the cross section clearly shown in FIGURES 5 and 7 and opposed parallel fingers 20, the free ends of which support a collar 22 on opposed trunnions 24 which are welded or otherwise secured to the fingers 20 so as to prevent removal thereof. The collar 22 is rotatably mounted on the operating shaft 26 of a longitudinal movement mechanism 28 of a trailer-truck landing gear. A collar 30 is secured to the shaft 26 by a pin or welding to prevent removal of the trunnion mounted collar 22 to the left (FIG. 5). The free end 31 of the shaft 26 is formed of a cross section complementary to the cross section of the socket portion 18, as is clear from FIGURES 5 and 7.

The longitudinal movement mechanism 28 includes a long stationary member 32 of the cross section illustrated and having spaced central sprocket teeth openings 34 securable to and beneath a truck-trailer. A shorter plate 36 of the configuration shown is supported beneath the member 32 for movement therealong by two spaced members or interlocks 38, the end portions of the plate being welded to said members. The shaft 26 is supported by spaced depending plates 40 welded to the bottom of the plate 36 between the members 38. A sprocket 42 is secured to the shaft 26 and engages the sprocket openings 34, extending through a slot 44 in the plate 36. A locking unit 46, including a four-sided member 48 and supported opposed locking lugs 50, is mounted on the shaft 26 by aligned apertures 52. A compression spring 54 about the shaft 26 biases the unit 46 to the left (FIG. 5) to engage the locking lugs 50 between teeth of the sprocket 42. A spacer sleeve 56 is provided on the shaft 26 to insure ready swiveling of the crank 12 when in the position of FIGURE 5 and to unlock the unit 46 when in the position of FIGURE 6 so that the gear may be rotated.

It is apparent from the foregoing that to actuate the sprocket and therethrough move the plate 36 longitudinally of the stationary member 32, it is but necessary to move the socket member 16 from the position of FIGURE 5 to the position of FIGURE 6 by pushing the crank 12 inwardly to engage the free end 31 of the shaft 26 with the socket portion 18. Thereafterwards, the crank 12 is rotated in the usual manner, meanwhile maintaining it in position against the force of the spring 54 by suitable pressure. The spring 54 returns the parts to the positions of FIGURE 5 on release. It is clear that the crank 12 and socket member 20 cannot be removed from the shaft 26 without destructive force, since the collar 30 is secured against removal and the trunnions 24 are welded or otherwise secured in position against removal. Thus, a simple solution to the crank loss problem is provided.

The novel combination described and illustrated includes the longitudinal movement mechanism of a landing gear. It is to be understood that the novel combination may include vertical operative mechanism of a stationary of longitudinally movable landing gear.

It is manifest that the disclosed structure fulfills the objects and advantages sought therefor.

It is to be understood that the foregoing description and the accompanying drawings have been given by way of illustration and example. It is also to be understood that changes in form of the elements, rearrangement of parts and substitution of equivalent elements, which will be obvious to those skilled in the art, are contemplated as within the scope of the present invention which is limited only by the claims which follow.

What is claimed is:

1. In combination, a permanently mounted swivel crank structure comprising a crank handle, a socket member at one end of said handle including a socket portion of predetermined internal cross section and spaced fingers, opposed permanently secured trunnions on said fingers, a first member having an annual opening rotatably supported by said trunnions, on operating shaft for a mechanism on one of which said first member is mounted for sliding movement, and a second member secured to said shaft against removal located outwardly of said first member preventing removal of the latter from said one end, said one end of the shaft being of a cross section complementary to that of the socket portion, said socket portion being movable into engagement with and being releasable from said one end of the shaft.

2. The combination of claim 1 in which said crank handle and socket member upon release of the latter from the end of the shaft may be swiveled through 360° for movement to an inoperative rest position, said spaced fingers being wider apart than the external diameter of the second member.

3. The combination of claim 1 in which said first and second members are collars.

4. The combination of claim 1 and including means preventing removal of said first member from the other end of the shaft and for supporting said shaft comprising a longitudinally movable plate of a longitudinal movement mechanism adapted to mount a truck-trailer landing gear, spaced depending members secured to the plate and rotatably supporting said shaft, and means on said shaft preventing removal thereof from said depending members.

5. The combination of claim 4 in which said shaft removal prevention means includes a sprocket mounted on and secured to said shaft and adapted to be rotated by said crank structure for longitudinal movement of said plate.

References Cited

UNITED STATES PATENTS

| 1,941,214 | 12/1933 | Kusterle | 74—547 |
| 3,321,998 | 5/1967 | Haney | 74—547 |

FRED C. MATTERN, JR., *Primary Examiner.*

F. D. SHOEMAKER, *Assistant Examiner.*